(12) United States Patent
Zheng

(10) Patent No.: US 12,139,339 B2
(45) Date of Patent: Nov. 12, 2024

(54) UNMANNED DISTRIBUTION SYSTEM AND METHOD

(71) Applicant: BEIJING GEEKPLUS TECHNOLOGY CO. LTD, Beijing (CN)

(72) Inventor: Yong Zheng, Beijing (CN)

(73) Assignee: BEIJING GEEKPLUS TECHNOLOGY CO. LTD, Beijing (CN)

( * ) Notice: Subject to any disclaimer, the term of this patent is extended or adjusted under 35 U.S.C. 154(b) by 524 days.

(21) Appl. No.: 17/600,642

(22) PCT Filed: Nov. 29, 2019

(86) PCT No.: PCT/CN2019/122126
§ 371 (c)(1),
(2) Date: Oct. 1, 2021

(87) PCT Pub. No.: WO2020/199628
PCT Pub. Date: Oct. 8, 2020

(65) Prior Publication Data
US 2022/0204269 A1    Jun. 30, 2022

(30) Foreign Application Priority Data
Apr. 4, 2019 (CN) .......................... 201910270136.7

(51) Int. Cl.
*B07C 3/02*  (2006.01)
*B65G 1/04*  (2006.01)
(Continued)

(52) U.S. Cl.
CPC .............. *B65G 1/1371* (2013.01); *B07C 3/02* (2013.01); *B65G 1/0457* (2013.01);
(Continued)

(58) Field of Classification Search
CPC .. B65G 1/1371; B65G 1/0457; B65G 1/0492; B65G 2203/0283; B65G 67/24; B07C 3/02; G06Q 10/08; G06Q 10/083
See application file for complete search history.

(56) References Cited

U.S. PATENT DOCUMENTS 5,953,234 A * 9/1999 Singer ................. B65G 1/1378
                                                      700/214
9,760,086 B2 * 9/2017 Woodtli ............... B65G 1/0492
(Continued)

FOREIGN PATENT DOCUMENTS

CN    107403293      11/2017
CN    108520371 A    9/2018
(Continued)

OTHER PUBLICATIONS

CNIPA, First Office Action for CN Application No. 201910270136.7, Oct. 28, 2023.
(Continued)

*Primary Examiner* — Patrick H Mackey
(74) *Attorney, Agent, or Firm* — Hodgson Russ LLP

(57) ABSTRACT

Disclosed are an unmanned distribution system and method. By means of the system, a temporary storage facility can be arranged at a preset location of a closed distribution area, for example, a corresponding temporary storage facility is arranged near a closed housing estate, community or unit; an external item to be distributed that needs to be distributed is received and temporarily stored by the arranged temporary storage facility; and a robot arranged inside the closed distribution area can obtain the item to be distributed from the temporary storage facility and distribute the item to be distributed within the closed distribution area.

19 Claims, 2 Drawing Sheets

(51) Int. Cl.
B65G 1/137 (2006.01)
G06Q 10/08 (2023.01)

(52) U.S. Cl.
CPC ........... B65G 1/0492 (2013.01); G06Q 10/08 (2013.01); B65G 2203/0283 (2013.01)

(56) References Cited

U.S. PATENT DOCUMENTS

| | | | |
|---|---|---|---|
| 10,618,735 B1* | 4/2020 | Oh | B65G 1/137 |
| 10,954,065 B2* | 3/2021 | Schroepf | B65G 1/1378 |
| 11,142,402 B2* | 10/2021 | Lert, Jr. | G05B 19/41815 |
| 11,521,153 B2* | 12/2022 | Han | B65G 65/00 |
| 2018/0330313 A1 | 11/2018 | Clarke et al. | |
| 2021/0284450 A1* | 9/2021 | Wang | B65G 1/0435 |

FOREIGN PATENT DOCUMENTS

| | | |
|---|---|---|
| CN | 109147179 A | 1/2019 |
| CN | 109203157 A | 1/2019 |
| CN | 109205157 | 1/2019 |
| CN | 109351643 | 2/2019 |
| CN | 109480955 A | 3/2019 |
| JP | 2001187620 | 7/2001 |
| JP | 2009001425 | 1/2009 |
| WO | 2017083406 | 5/2017 |
| WO | 2019007215 | 1/2019 |
| WO | 2019124335 | 6/2019 |

OTHER PUBLICATIONS

WIPO, International Search Report and Written Opinion for International Application No. PCT/CN2019/122126, Feb. 24, 2020.
JPO, Decision to Grant Patent for JP Application No. 2021-560219, Jun. 14, 2022.

* cited by examiner

UNMANNED DISTRIBUTION SYSTEM AND METHOD

CROSS-REFERENCE TO RELATED APPLICATIONS

The present disclosure is a national phase entry under 35 U.S.C. § 371 of International Application PCT/CN2019/122126, filed Nov. 29, 2019, which claims the benefit of and priority to Chinese Patent Application No. 201910270136.7, filed Apr. 4, 2019, the entire disclosure of which is incorporated herein by reference.

FIELD

Embodiments of the present disclosure relate to the field of logistics distribution technologies, and in particular to an unmanned distribution system and method.

BACKGROUND

With the rapid development of e-commerce, it has not only brought unprecedented development opportunities to the logistics industry, but also brought severe challenges to the logistics industry.

SUMMARY

According to a first aspect, an embodiment of the present disclosure provides an unmanned distribution system, including: at least one transportation apparatus, at least one temporary storage facility, and at least one robot. The transportation apparatus is located outside a closed distribution area and includes at least one container storing items to be distributed. The temporary storage facility is arranged at a preset location in the closed distribution area, and the temporary storage facility is configured to receive and temporarily store the item to be distributed transported by the transportation apparatus. The robot is located inside the closed distribution area, and the robot is configured to obtain the item to be distributed from the temporary storage facility and distribute the item to be distributed inside the closed distribution area.

According to a second aspect, an embodiment of the present disclosure further provides an unmanned distribution method, including receiving and temporarily storing, by a temporary storage facility, items to be distributed transported by a transportation apparatus, the temporary storage facility being arranged at a preset location in a closed distribution area, the transportation apparatus being located outside the closed distribution area and including at least one container storing the items to be distributed therein; and obtaining, by a robot, the item to be distributed from the temporary storage facility and distributing the item to be distributed inside the closed distribution area, the robot being located inside the closed distribution area.

According to a third aspect, an embodiment of the present disclosure further provides a computer-readable storage medium storing a computer program thereon, when executed by a processor the computer program implementing an unmanned distribution method including receiving and temporarily storing, by a temporary storage facility, items to be distributed transported by a transportation apparatus, the temporary storage facility being arranged at a preset location in a closed distribution area, the transportation apparatus being located outside the closed distribution area and including at least one container storing the items to be distributed therein; and obtaining, by a robot, the item to be distributed from the temporary storage facility and distributing the item to be distributed inside the closed distribution area, the robot being located inside the closed distribution area.

BRIEF DESCRIPTION OF THE DRAWINGS

By reading the detailed description of the non-limiting embodiments with reference to the following drawings, other features, objectives and advantages of the present disclosure will become more apparent. The drawings are only for the purpose of illustrating the embodiments and are not to be construed as limiting. Throughout the drawings, the same reference numerals are used to represent the same parts. In the drawings.

DETAILED DESCRIPTION

Figure 1:
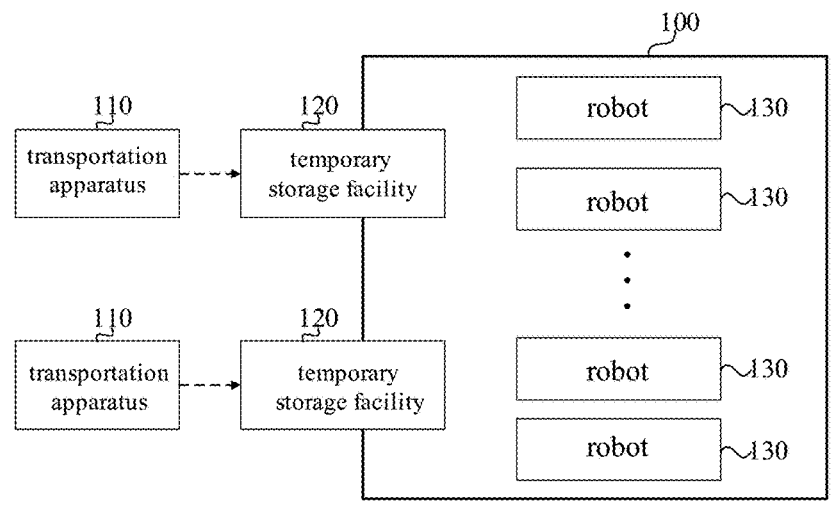
FIG. 1 is a schematic structural diagram of an unmanned distribution system according to an embodiment of the present disclosure.

The exemplary embodiments of the present disclosure will be described in more detail below with reference to the accompanying drawings. Although the exemplary embodiments of the present disclosure are shown in the accompanying drawings, it is understood that the exemplary embodiments described here are only used to explain the present disclosure, rather than limiting the present disclosure. Instead, these embodiments are provided in the present disclosure for a more thorough understanding of the present disclosure and to fully convey the scope of the present disclosure to those skilled in the art. In addition, it should also be noted that, for ease of description, the drawings only show parts related to the present disclosure instead of all the structures.

In existing distribution solutions, logistics distribution is mainly implemented manually or by unmanned robots. For manual distribution, the labor cost is high, and distribution staffs often cannot distribute cargoes on time, resulting in low timeliness; for unmanned robot distribution, although it can save labor costs, same as manual distribution, it cannot satisfy special units or communities that have requirements for privacy and safety, thus making an adverse impact on special units or communities to a certain extent.

The embodiment of the present disclosure provides an unmanned distribution solution. A temporary storage facility can be arranged at a preset location in a closed distribution area. For example, a corresponding temporary storage facility can be arranged near a closed housing estate, community or unit. The arranged temporary storage facility receives and temporarily stores an external item to be distributed that needs to be distributed, and a robot arranged inside the closed distribution area can obtain the item to be distributed from the temporary storage facility and distribute the item to be distributed inside the closed distribution area. By means of the above method, the implementation of unmanned distribution can be ensured and external transportation apparatus or distribution staffs do not need to frequently enter and exit the closed distribution area, thereby ensuring the privacy and safety of the closed distribution area during distribution.

In order to better understand the technical solutions of the embodiments of the present disclosure, the following briefly introduces the distribution process of items to be distributed (e.g., to-be-distributed articles). Its process is as follows: generally distribution stations are arranged in distribution areas; at the distribution stations, the items to be distributed are manually selected and manually inspected, unloaded, and sorted; and then the sorted items to be distributed are transported and delivered through deliverers or unmanned distribution devices, so that the items to be distributed reach target consignees.

In view of the particularity of the deliverers or unmanned distribution devices, regardless of distribution by the deliverers or by the unmanned distribution devices, they both require free access to the distribution area to complete the distribution. However, the free access to the distribution area will affect the privacy and safety of the distribution area to a certain extent, resulting in the inability to meet the privacy and safety requirements of special units or communities. Therefore, it is required to improve the existing distribution methods to ensure the privacy and safety of the distribution area during distribution.

The following describes the unmanned distribution system and method according to the embodiments of the present disclosure in detail through the following embodiments and alternative solutions.

FIG. 1 is a schematic structural diagram of an unmanned distribution system according to an embodiment of the present disclosure. The technical solution of this embodiment can be applied to a situation of distributing an item to be distributed, and is especially suitable for a situation of distributing an item to be distributed to a closed distribution area. The system can implement the unmanned distribution method according to any embodiment of the present disclosure. As shown in FIG. 1, the unmanned distribution system according to an embodiment of the present disclosure includes at least one transportation apparatus 110, at least one temporary storage facility 120, and at least one robot 130, wherein

- the transportation apparatus 110 is located outside a closed distribution area 100 and includes at least one container 111 storing items to be distributed therein;
- the temporary storage facility 120 is arranged at a preset location in the closed distribution area 100, and the temporary storage facility 120 is configured to receive the item to be distributed stored in the container 111 of the transportation apparatus 110 and temporarily store the received item to be distributed;
- the robot 130 is located inside the closed distribution area, and the robot 130 is configured to obtain the temporarily stored item to be distributed from the temporary storage facility 120 and distribute the item to be distributed in the closed distribution area 100.

In this embodiment, the transportation apparatus 110 refers to a device that is located outside the closed distribution area 100 and configured to transport the container 111 storing the items to be distributed. The container 111 containing the items to be distributed and carried on the transportation apparatus 110 is configured as a detachable and movable container 111. A number of items to be distributed that need to be distributed are stored in the container 111 on the transportation apparatus 110.

Figure 2:
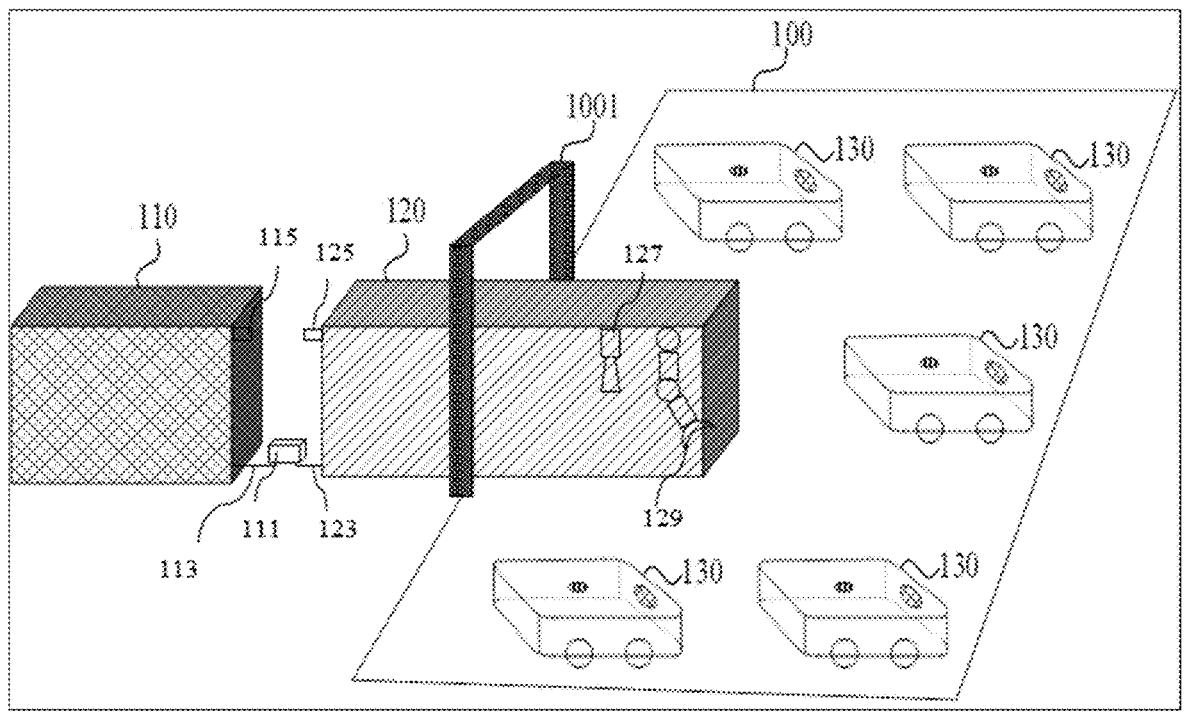
FIG. 2 is a schematic diagram of a scenario between a transportation apparatus and a temporary storage facility in an unmanned distribution system according to an embodiment of the present disclosure.

In this embodiment, FIG. 2 is a schematic diagram of a scenario between a transportation apparatus and a temporary storage facility in an unmanned distribution system according to an embodiment of the present disclosure. Referring to FIG. 2, the temporary storage facility 120 may be arranged at a preset location in the closed distribution area 100. In at least one embodiment, the temporary storage facility 120 should be arranged at a proper location to ensure that a part of a body of the temporary storage facility 120 is located inside the closed distribution area 100 and the other part of the body of the temporary storage facility 120 is located outside the closed distribution area 100. In an embodiment, a temporary storage opening 1001 of the closed distribution area 100 is arranged at a preset location in the closed distribution area 100 and configured to communicate the inside of the closed distribution area 100 with the outside of the closed distribution area 100, and the temporary storage facility 120 is installed at the location of the temporary storage opening 1001. In at least one embodiment, the temporary storage facility 120 may be configured as a building facility or a large temporary storage container 111, or a large container 111 for storing cargoes. In at least one embodiment, a corresponding server is included in the temporary storage facility 120, and the temporary storage facility 120 can be supported by the server in the temporary storage facility 120 to realize control and analysis functions for various distribution processes of the item to be distributed.

It is understandable that in actual scenarios, the number of transportation apparatuses 110 and the number of temporary storage facilities 120 in the unmanned distribution system can be set according to actual needs. Although FIG. 2 only shows one transportation apparatus 110 and one temporary storage facility 120, this is only an example and does not limit the number of transportation apparatuses and the number of temporary storage facilities in this embodiment.

In this embodiment, referring to FIG. 2, when the transportation apparatus 110 arrives in a position near the temporary storage facility 120 located at a preset location in the closed distribution area 100, the transportation apparatus 110 may be connected with the pre-installed temporary storage facility 120. After the transportation apparatus 110 is connected with the temporary storage facility 120, the temporary storage facility 120 can receive a plurality of items to be distributed stored in the container 111 from the container 111 of the transportation apparatus 110, and the temporary storage facility 120 can also temporarily store each received item to be distributed, so that the items to be distributed temporarily stored by the temporary storage facility 120 can be subsequently distributed. In at least one embodiment, the items to be distributed stored in the container 111 on the transportation apparatus 110 can be all distributed to the temporary storage facility 120 where the current closed distribution area 100 is located; or part of the items to be distributed can be distributed to the temporary storage facility 120 where the current closed distribution area 100 is located and the other part can be distributed to the temporary storage facilities 120 where other closed distribution areas 100 are located. The assignment depends on the actual distribution requirements of the items to be distributed.

In this embodiment, referring to FIG. 2, a corresponding server is included in the temporary storage facility 120, and the temporary storage facility 120 can be supported by the server in the temporary storage facility 120 to realize control and analysis functions for various distribution processes of the item to be distributed. The temporary storage facility 120 may select a target item to be distributed that needs to be distributed according to the various items to be distributed stored therein. In addition, after the target item to be distributed is selected, the temporary storage facility 120 can select a target robot from the a plurality of robots 130 in the closed distribution area, and the target item to be distributed is assigned to the target robot 130 so that the target robot 130 distributes the target item to be distributed in the closed distribution area 100. It is understandable that when assigned to the target robot 130, the target item to be distributed can be automatically grabbed to the target robot 130 by mechanical equipment, or the target item to be distributed can be assigned to the target robot 130 by manual operation. The details will be described later.

The embodiment of the present disclosure provides an unmanned distribution solution. A temporary storage facility can be arranged at a preset location in a closed distribution area. For example, a corresponding temporary storage facility can be arranged near a closed housing estate, community or unit. The arranged temporary storage facility receives and temporarily stores an external item to be distributed that needs to be distributed, and a robot arranged inside the closed distribution area can obtain the item to be distributed from the temporary storage facility and distribute the item to be distributed inside the closed distribution area. Because the robot only receives and distributes the item to be distributed in a closed distribution area without entering and exiting the closed distribution area, unmanned distribution of the item to be distributed can be realized, and external distribution devices or distribution staffs do not need to frequently enter and exit the closed distribution area, thereby ensuring the privacy and safety of the closed distribution area during distribution.

In an implementation manner of this embodiment, referring to FIG. 2, for each transportation apparatus 110 in the unmanned distribution system, each item to be distributed stored in the container 111 carried by the transportation apparatus 110 is distributed to a unique current closed distribution area 100, but cannot be distributed to other closed distribution areas other than the current closed distribution area 100. In an embodiment, when the transportation apparatus 110 arrives at the closed distribution area 100, the container 111 storing the items to be distributed and carried on the transportation apparatus 110 is placed at the temporary storage facility 120 corresponding to the closed distribution area 100, and the container 111 storing the items to be distributed and carried on the transportation apparatus 110 is connected with the temporary storage facility 120.

In an implementation manner of this embodiment, this implementation manner can be combined with solutions in one or more of the foregoing embodiments. Referring to FIG. 2, the temporary storage facility 120 is provided with an input port and an output port which are positioned oppositely. When the transportation apparatus 110 reaches the closed distribution area 100, a container 111 opening of one container 111 of the transportation apparatus 110 is connected with the input port of the temporary storage facility 120. After successful connection, the temporary storage facility 120 can receive and temporarily store the item to be distributed transported by the transportation apparatus 110, so that the robot 130 subsequently obtains, from the output port of the temporary storage facility 120, the item to be distributed temporarily stored by the temporary storage facility 120.

In some embodiments, an example where the transportation apparatus 110 is configured as an urban distribution vehicle (which may be an unmanned vehicle or a manned vehicle) is described for explanation. After the urban distribution vehicle reaches a designated closed distribution area, the urban distribution vehicle will drop and hang the movable container 111 carried by the urban distribution vehicle, so that the container 111 opening of the movable container 111 is connected with the input port of the temporary storage facility 120 in the closed distribution area after the movable container 111 is dropped and hung.

In an implementation manner of this embodiment, this implementation manner can be combined with solutions in one or more of the foregoing embodiments. Referring to FIG. 2, a first connecting sensor 125 is arranged on a side of the temporary storage facility 120 close to the transportation apparatus 110, and a second connecting sensor 115 is arranged on a side of the transportation apparatus 110 close to the temporary storage facility 120. When the first connecting sensor 125 and the second connecting sensor 115 are successfully connected, a prompt message indicating successful connection is reported to the temporary storage facility 120 and the transportation apparatus 110 to prompt that the container 111 opening of the container 111 storing the items to be distributed and carried on the transportation apparatus 110 and the input port of the temporary storage facility 120 have been successfully connected.

With the above implementation manner, two connecting sensors installed in the temporary storage facility and the transportation apparatus respectively can be configured to identify the connecting, so as to ensure that the temporary storage facility and the transportation apparatus can be accurately connected, thus avoiding the problem that unsuccessful connecting results in untimely distribution of the items to be distributed and falling of the items to be distributed stored in the container 111 carried in the transportation apparatus.

In an implementation manner of this embodiment, this implementation manner can be combined with solutions in one or more of the foregoing embodiments. Referring to FIG. 2, a conveying device 113 is arranged inside the container 111 of the transportation apparatus 110, and a conveying device 123 is also arranged in the temporary storage facility 120. After knowing that the container 111 opening of one container 111 of the transportation apparatus 110 is connected with the input port of the temporary storage facility 120, the conveying device 113 arranged inside the container 111 of the transportation apparatus 110 can be started to convey the stored items to be distributed to the temporary storage facility through the container 111 opening of the container 111 of the transportation apparatus 110 and the input port of the temporary storage facility 120. The temporary storage facility 120 also uses the conveying device 123 to receive the conveyed items to be distributed. In at least one embodiment, both the container 111 of the transportation apparatus 110 and the conveying device 123 arranged inside the temporary storage facility 120 can both adopt a conveying belt. In some embodiments, after knowing the successful connecting, the container 111 of the transportation apparatus 110 and the conveying device 123 arranged inside the temporary storage facility 120 can be started manually or controlled to be automatically started by sending a start signal.

By adopting the above-mentioned various embodiments, after the transportation apparatus reaches the closed distribution area, manual unloading and handling of cargoes are not required, the items to be distributed can be directly conveyed to the temporary storage facility by the conveying device 123 arranged inside. The entire process does not require manual unloading and conducts conveying operation completely by the conveying device 123, and the items to be distributed can be prevented from contact and damage during manual unloading. Moreover, the conveying device 123 can speed up the unloading and save labor costs, thereby increasing the logistics distribution rate.

In an implementation manner of this embodiment, this implementation manner can be combined with solutions in one or more of the foregoing embodiments. Referring to FIG. 2, the temporary storage facility 120 includes an input port and an output port which are positioned oppositely. The input port of the temporary storage facility 120 can be switched between an open state and a closed state. In at least one embodiment, switching the input port of the catch facility 120 between the open state and the closed state may be implemented by sending a switching signal to an operator to prompt manual switching, or the input port of the catch facility 120 may be automatically switched between the open state and the closed state through a corresponding motor device by sending a switching signal.

In some embodiments, the temporary storage facility 120 may detect whether the container 111 opening of one container 111 of the transportation apparatus 110 is successfully connected with the input port of the temporary storage facility 120, and when successful connection is detected, the input port arranged on the temporary storage facility 120 is controlled to be switched to the open state so that the temporary storage facility 120 can obtain the stored items to be distributed from the container 111 of the transportation apparatus 110. In addition, when it is detected that the container 111 opening of one container 111 of the transportation apparatus 110 is successfully connected with the input port of the temporary storage facility 120, the transportation apparatus 110 can control the container 111 opening of the container 111 of the transportation apparatus 110 to be switched to the open state, so as to convey the stored items to be distributed to the temporary storage facility 120.

Exemplarily, a detection sensor and a controller may be arranged in the temporary storage facility 120, and the detection sensor can detect whether the container 111 opening of one container 111 of the transportation apparatus 110 and the input port of the temporary storage facility 120 are in a connected state. If it is detected that the container 111 opening and the input port are in a connected state, a first control signal is then sent to the controller so that the input port of the temporary storage facility 120 is controlled to be in the open state through the controller; if it is detected that the container 111 opening and the input port are not in a connected state, a second control signal is then sent to the controller so that the input port of the temporary storage facility 120 is controlled to be in the closed state through the controller.

By adopting the above implementation manner, a container 111 door can be arranged to ensure that the container 111 of the transportation apparatus is allowed to convey the items to be distributed and the temporary storage facility is allowed to receive the items to be distributed conveyed from the container 111 only in the case of successful connecting. It can avoid problems occurring in the case of inaccurate connecting, such as falling of the items to be distributed during the conveying process and a disordered receiving process.

In some embodiments, referring to FIG. 2, when it is detected that the items to be distributed stored in the transportation apparatus 110 are conveyed into the temporary storage facility 120, the input port of the temporary storage facility 120 can be controlled to be in a closed state and the input port of the temporary storage facility 120 can be disconnected from the container 111 opening of one container 111 of the transportation apparatus 110.

By adopting the above implementation manner, the temporary storage facility inside can be prevented from direct contact with a third party during the entire process of receiving the items to be distributed. In this way, it can be ensured that the temporary storage facility will not be opened to external people for the closed distribution area, and the items to be distributed can be prevented from damage caused if the external people touch the items to be distributed again.

In an implementation manner of this embodiment, this implementation manner can be combined with solutions in one or more of the foregoing embodiments. Referring to FIG. 2, the temporary storage facility 120 is provided therein with a grabbing assembly 129, and by the grabbing assembly 129, the temporary storage facility 120 can grab anyone of the items to be distributed stored in the temporary storage facility 120. The temporary storage facility 120 can grab a target item to be distributed from the plurality of items to be distributed through the grabbing assembly 129 and assign the grabbed target item to be distributed to a selected target robot 130 located in the closed distribution area 100 through the grabbing assembly 129.

In an implementation manner of this embodiment, this implementation manner can be combined with solutions in one or more of the foregoing embodiments. Referring to FIG. 2, the temporary storage facility 120 is provided with an identifying assembly 127. Through the identifying assembly 127, the temporary storage facility 120 can identify item information carried on each item to be distributed and select a target item to be distributed from the various items to be distributed. The item information here includes basic attribute information and address information. Exemplarily, the basic attribute information can at least reflect a distribution order of the item to be distributed and reflect specifications of a robot required by the item to be distributed; the address information can reflect the distribution addresses of the item to be distributed. By adopting the above implementation manner, the distribution information of the received items to be distributed can be statistically analyzed through the identifying assembly 127 so that the subsequent items to be distributed can be reasonably distributed according to actual distribution requirements.

In an implementation manner of this embodiment, this implementation manner can be combined with solutions in one or more of the foregoing embodiments. Referring to FIG. 2, after selecting the target item to be distributed from the various items to be distributed, the temporary storage facility 120 may select a target robot 130 from plurality of robots in an idle state according to the item information of the target item to be distributed. In addition, the temporary storage facility 120 may send a distribution instruction regarding the target item to be distributed to the target robot 130 and instruct, through the distribution instruction, the target robot 130 to distribute the target item to be distributed in the closed distribution area. In at least one embodiment, the various robots 130 may have different specifications, and the robots 130 in an idle state are at a preset location at a junction of the output port of the temporary storage facility 120 and the closed delivery area 100. By adopting the above implementation manner, it can be ensured that a suitable robot can reach a predetermined area in time and distribute the item to be distributed in time.

In an implementation manner of this embodiment, this implementation manner can be combined with solutions in one or more of the foregoing embodiments. Referring to FIG. 2, the temporary storage facility 120 is further provided with an output port, and the output port of the temporary storage facility 120 can be switched between an open state and a closed state. In at least one embodiment, switching the output port of the catch facility 120 between the open state and the closed state may be implemented by sending a switching signal to an operator to prompt manual switching, or the input port of the catch facility 120 may be automatically switched between the open state and the closed state through a corresponding motor device by sending a switching signal.

In some embodiments, the temporary storage facility 120 can detect whether the robot 130 needs to obtain, from the output port of the temporary storage facility 120, the items to be distributed that need to be distributed. If it is detected that the item to be distributed needs to be obtained, the temporary storage facility 120 may also control the output port of the temporary storage facility 120 to be in the open state, so that the target item to be distributed is assigned to the target robot 130 through the output port. In at least one embodiment, after the target item to be distributed is assigned to the target robot 130, the temporary storage facility 120 controls the output port of the temporary storage facility to be in the closed state. By adopting the above implementation manners, it can be ensured that the output port of the temporary storage facility is opened only when the item to be distributed is assigned to the robot, and not opened at other times, which can ensure the privacy and safety of the item to be distributed and also can prevent unsolicited people from touching and damaging the items to be distributed.

Exemplarily, the temporary storage facility 120 may also detect, by a sensor, whether the robot 130 needs to obtain an item to be distributed that needs to be distributed from the output port of the temporary storage facility 120. If it is detected that the item to be distributed needs to be obtained, a third control signal is sent to the controller so that the output port of the temporary storage facility 120 is controlled by the controller to be in the open state; if it is detected that the item to be distributed does not need to be obtained, a fourth control signal is sent to the controller so that the output port of the temporary storage facility 120 is controlled by the controller to be in the closed state.

In an implementation manner of this embodiment, this implementation manner can be combined with solutions in one or more of the foregoing embodiments. Referring to FIG. 2, a safe distribution container 111 is arranged on the target robot 130, and the arranged safe distribution container 111 can only be allowed to be opened safely based on a password message sent by the temporary storage facility to a consignee of the item. The target robot 130 can store the target item to be distributed, assigned by the temporary storage facility 120, through the safe distribution container 111, so as to distribute the target item to be distributed in the closed distribution area 100. By adopting the above implementation manner, the safe distribution container 111 is only allowed to be opened by a security password; in this way, the item to be distributed can be kept in a closed state during distribution, so that unsolicited people cannot touch the item to be distributed, thereby ensuring the safety and privacy of the item to be distributed.

Figure 3:
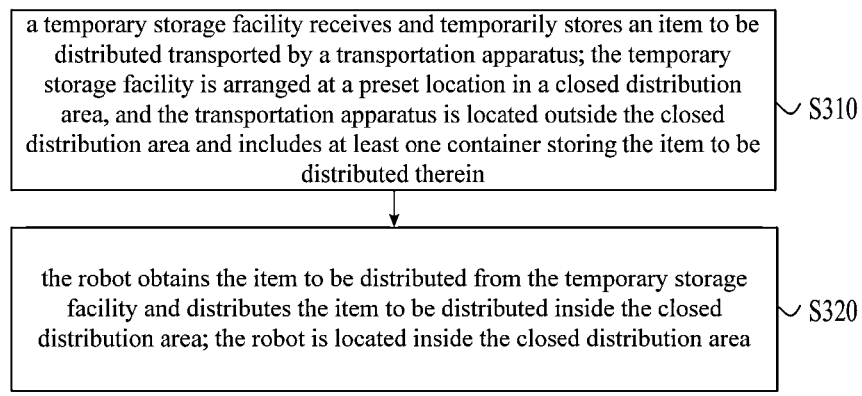
FIG. 3 is a schematic flowchart of an unmanned distribution method according to an embodiment of the present disclosure.

FIG. 3 is a schematic flowchart of an unmanned distribution method according to an embodiment of the present disclosure. The technical solution of this embodiment can be applied to a situation of distributing an item to be distributed, and is especially suitable for a situation of distributing an item to be distributed to a closed distribution area. The method can be executed by the unmanned distribution method according to any embodiment of the present disclosure. As shown in FIG. 3, the unmanned distribution method according to the embodiment of the present disclosure includes step S310 and step S320.

In step S310, a temporary storage facility receives and temporarily stores items to be distributed transported by a transportation apparatus; the temporary storage facility is arranged at a preset location in a closed distribution area, and the transportation apparatus is located outside the closed distribution area and includes at least one container 111 storing the items to be distributed therein.

On the basis of the foregoing embodiment, in at least one embodiment, the method further includes: when the transportation apparatus arrives in the closed distribution area, connecting a container 111 opening of one container 111 of the transportation apparatus with the input port of the temporary storage facility, and obtaining, by the robot, the item to be distributed from an output port of the temporary storage facility; the temporary storage facility is provided with an input port and an output port which are positioned oppositely.

On the basis of the foregoing embodiment, in at least one embodiment, the method may further include: when the transportation apparatus arrives in the closed distribution area, dropping and hanging the carried container 111 by the transportation apparatus so that the container 111 opening of the container 111 dropped and hung is connected to the input port of the temporary storage facility.

On the basis of the foregoing embodiment, in at least one embodiment, the method further includes: conveying the item to be distributed stored in the container 111 to the temporary storage facility through conveying devices 113, 123; the conveying devices 113, 123 are respectively arranged in the container 111 of the transportation apparatus and the temporary storage facility.

On the basis of the foregoing embodiment, in at least one embodiment, the input port of the temporary storage facility can be switched between an open state and a closed state.

On the basis of the foregoing embodiment, in at least one embodiment, the method further includes: in response to detecting the input port is successfully connected with a container 111 opening of one container 111 of the transportation apparatus, controlling the input port to be in the open state by the temporary storage facility.

On the basis of the foregoing embodiment, in at least one embodiment, the method further includes: in response to detecting the item to be distributed stored in the transportation apparatus is conveyed into the temporary storage facility, controlling the input port to be in the closed state by the temporary storage facility.

In step S320, the robot obtains the item to be distributed from the temporary storage facility and distributes the item to be distributed inside the closed distribution area; the robot is located inside the closed distribution area.

On the basis of the foregoing embodiment, in at least one embodiment, the temporary storage facility 120 grabs a target item to be distributed that needs to be distributed from the plurality of items to be distributed through a grabbing assembly 129 and assign the grabbed target item to be distributed to a target robot through the grabbing assembly 129; the grabbing assembly 129 is arranged in the temporary storage facility.

On the basis of the foregoing embodiment, in at least one embodiment, the output port of the temporary storage facility can be switched between an open state and a closed state.

On the basis of the foregoing embodiment, in at least one embodiment, the method further includes: when the robot obtains the item to be distributed from the output port of the temporary storage facility, controlling the output port of the temporary storage facility to be in the open state by the temporary storage facility.

On the basis of the foregoing embodiment, in at least one embodiment, the method further includes: in response to the robot obtaining the item to be distributed from the output port of the temporary storage facility, controlling the output port of the temporary storage facility to be in the closed state by the temporary storage facility.

On the basis of the foregoing embodiment, in at least one embodiment, the method further includes: identifying, by the temporary storage facility, item information carried on the item to be distributed through an identifying assembly 127, and selecting the target item to be distributed from the plurality of items to be distributed; the item information includes basic attribute information and address information; the identifying assembly 127 is arranged in the temporary storage facility.

On the basis of the foregoing embodiment, in at least one embodiment, the method further includes: in response to selecting the target item to be distributed from the plurality of items to be distributed, selecting, by the temporary storage facility, a target robot from a plurality of robots in an idle state according to the target item to be distributed; and sending a distribution instruction of the target item to be distributed to the target robot to instruct the target robot to distribute the target item to be distributed in the closed distribution area.

On the basis of the foregoing embodiment, in at least one embodiment, the method further includes: storing, by the target robot, the target item to be distributed assigned by the temporary storage facility in a safe distribution container 111; the safe distribution container 111 is arranged on the target robot and can be opened safely according to a password message sent by the temporary storage facility to a consignee of the item.

The unmanned distribution method according to the embodiment of the present disclosure can be applied to the unmanned distribution system according to any of the above embodiments of the present disclosure, and has the corresponding functions and beneficial effects of the unmanned distribution system. For technical details that are not described in detail in the above embodiments, reference can be made to the unmanned distribution system according to any embodiment of the present disclosure.

An embodiment of the present disclosure further provides a computer-readable medium, having a computer program stored thereon, and the program implements the unmanned distribution method according to the forgoing embodiment when executed by a processor.

It should be noted that the above are only the embodiments of the present invention and the technical principles applied thereto. Those skilled in the art will appreciate that the present invention is not limited to the embodiments described herein, and that various modifications, changes and substitutions may be made without departing from the scope of the present invention. Therefore, while the present invention has been described in detail by the above embodiments, the present invention is not limited to the above embodiments, and other equivalent embodiments may be included without departing from the inventive concept. The scope of the present invention is determined by the scope of the appended claims.

What is claimed is:

1. An unmanned distribution system, comprising:
at least one transportation apparatus located outside a closed distribution area and comprising at least one container storing an item to be distributed;
at least one temporary storage facility arranged at a preset location in the closed distribution area, and configured to receive and temporarily store the item to be distributed transported by the transportation apparatus; and
at least one robot located inside the closed distribution area, and configured to obtain the item to be distributed from the temporary storage facility and distribute the item to be distributed inside the closed distribution area,
wherein in response to a target item to be distributed being selected from a plurality of items to be distributed, the temporary storage facility is further configured to:
select a target robot from a plurality of robots in an idle state according to the target item to be distributed; and
send a distribution instruction regarding the target item to be distributed to the target robot to instruct the target robot to distribute the target item to be distributed in the closed distribution area.

2. The system according to claim 1, wherein the temporary storage facility is provided with an input port and an output port positioned oppositely; when the transportation apparatus arrives in the closed distribution area, a container opening of one container of the transportation apparatus is connected with the input port of the temporary storage facility, and the robot obtains the item to be distributed from the output port of the temporary storage facility.

3. The system according to claim 2, wherein when the transportation apparatus arrives in the closed distribution area, the transportation apparatus is configured to drop and hang the carried container so that the container opening of the container dropped and hung is connected to the input port of the temporary storage facility.

4. The system according to claim 2, wherein the container of the transportation apparatus and the temporary storage facility are each provided therein with a conveying device, and the conveying device is configured to convey the item to be distributed stored in the container into the temporary storage facility.

5. The system according to claim 2, wherein the input port of the temporary storage facility has an open state and a closed state.

6. The system according to claim 5, wherein a side of the temporary storage facility close to the transportation apparatus is provided with a first connecting sensor, and a side of the transportation apparatus close to the temporary storage facility is provided with a second connecting sensor.

7. The system according to claim 5, wherein:
the temporary storage facility is further configured to control the input port to be in the open state in response to detecting the input port is successfully connected with the container opening of one container of the transportation apparatus; or
the temporary storage facility is further configured to control the input port to be in the closed state in response to detecting the item to be distributed stored in the transportation apparatus is conveyed into the temporary storage facility.

8. The system according to claim 2, wherein the output port of the temporary storage facility has an open state and a closed state.

9. The system according to claim 8, wherein the temporary storage facility is further configured to control the output port of the temporary storage facility to be in the open state when the robot obtains the item to be distributed from the output port of the temporary storage facility.

10. The system according to claim 9, wherein the temporary storage facility is further configured to control the output port of the temporary storage facility to be in the closed state in response to the robot obtaining the item to be distributed from the output port of the temporary storage facility.

11. The system according to claim 1, wherein the temporary storage facility is provided with a grabbing assembly; and
the temporary storage facility is further configured to grab a target item to be distributed that needs to be distributed from a plurality of items to be distributed through the grabbing assembly and assign the grabbed target item to be distributed to a target robot through the grabbing assembly.

12. The system according to claim 1, wherein the temporary storage facility is provided with an identifying assembly; the temporary storage facility is further configured to identify item information carried on the item to be distributed through the identifying assembly and select a target item to be distributed from a plurality of items to be distributed; and the item information comprising basic attribute information and address information.

13. An unmanned distribution method, comprising:
receiving and temporarily storing an item to be distributed transported by a transportation apparatus, by a temporary storage facility, the temporary storage facility being arranged at a preset location in a closed distribution area, the transportation apparatus being located outside the closed distribution area and comprising at least one container storing the item to be distributed therein; and
obtaining the item to be distributed from the temporary storage facility and distributing the item to be distributed inside the closed distribution area by a robot, the robot being located inside the closed distribution area,
wherein in response to selecting a target item to be distributed from a plurality of items to be distributed, the method further comprises:
selecting a target robot from a plurality of robots in an idle state according to the target item to be distributed; and
sending a distribution instruction of the target item to be distributed to the target robot to instruct the target robot to distribute the target item to be distributed in the closed distribution area.

14. The method according to claim 13, further comprising:
when the transportation apparatus arrives in the closed distribution area, connecting a container opening of one container of the transportation apparatus with an input port of the temporary storage facility, and obtaining the item to be distributed from an output port of the temporary storage facility by the robot, the temporary storage facility being provided with the input port and the output port positioned oppositely.

15. The method according to claim 14, further comprising:
when the transportation apparatus arrives in the closed distribution area, dropping and hanging the carried container by the transportation apparatus so that the container opening of the container dropped and hung is connected to the input port of the temporary storage facility.

16. The method according to claim 14, wherein the input port of the temporary storage facility has an open state and a closed state.

17. The method according to claim 16, further comprising:
in response to detecting the input port is successfully connected with the container opening of one container of the transportation apparatus, controlling the input port to be in the open state by the temporary storage facility; or, in response to detecting the item to be distributed stored in the transportation apparatus is conveyed into the temporary storage facility, controlling the input port to be in the closed state by the temporary storage facility.

18. The method according to claim 17, wherein detecting that the input port is successfully connected with the container opening of one container of the transportation apparatus comprises:
receiving a prompt message indicating successful connection which is reported by at least one of a sensor of the transportation apparatus and a sensor of the temporary storage facility.

19. A computer-readable storage medium, having a computer program stored thereon, wherein, when executed by a processor, the computer program implements an unmanned distribution method comprising:
receiving and temporarily storing an item to be distributed transported by a transportation apparatus by a temporary storage facility, the temporary storage facility being arranged at a preset location in a closed distribution area, the transportation apparatus being located outside the closed distribution area and comprising at least one container storing the item to be distributed therein; and
obtaining the item to be distributed from the temporary storage facility and distributing the item to be distributed inside the closed distribution area by a robot, the robot being located inside the closed distribution area,
wherein in response to selecting a target item to be distributed from a plurality of items to be distributed, the unmanned distribution method further comprises:
selecting a target robot from a plurality of robots in an idle state according to the target item to be distributed; and
sending a distribution instruction of the target item to be distributed to the target robot to instruct the target robot to distribute the target item to be distributed in the closed distribution area.

* * * * *